T. J. HAYES.
BLINDSTITCH SEWING MACHINE.
APPLICATION FILED AUG. 14, 1913.

1,230,159.

Patented June 19, 1917.
5 SHEETS—SHEET 1.

Witnesses.
J. Morrill Fuller
Joseph D. Ashe.

Inventor.
Thomas J. Hayes,
by Heard Smith & Tennant
Atty's.

T. J. HAYES.
BLINDSTITCH SEWING MACHINE.
APPLICATION FILED AUG. 14, 1913.

1,230,159.

Patented June 19, 1917.
5 SHEETS—SHEET 2.

Witnesses.
J. Morrill Fuller
Joseph D. Ashe.

Inventor.
Thomas J. Hayes,
by Heard Smith & Tennant.
Atty's.

T. J. HAYES.
BLINDSTITCH SEWING MACHINE.
APPLICATION FILED AUG. 14, 1913.

1,230,159.

Patented June 19, 1917.
5 SHEETS—SHEET 4.

Witnesses.
J. Morrill Fuller
Joseph D. Ashe

Inventor.
Thomas J. Hayes,
by Heard Smith & Tennant
Atty's

T. J. HAYES.
BLINDSTITCH SEWING MACHINE.
APPLICATION FILED AUG. 14, 1913.

1,230,159.

Patented June 19, 1917.
5 SHEETS—SHEET 5.

Witnesses.
J. Morrill Fuller
Joseph D. Ashe

Inventor,
Thomas J. Hayes,
by Heard Smith & Tennant.
Atty's.

UNITED STATES PATENT OFFICE.

THOMAS J. HAYES, OF BOSTON, MASSACHUSETTS, ASSIGNOR TO ARBETTER FELLING MACHINE COMPANY, OF BOSTON, MASSACHUSETTS, A CORPORATION OF MAINE.

BLINDSTITCH SEWING-MACHINE.

1,230,159. Specification of Letters Patent. Patented June 19, 1917.

Application filed August 14, 1913. Serial No. 784,687.

*To all whom it may concern:*

Be it known that I, THOMAS J. HAYES, a citizen of the United States, and resident of Boston, county of Suffolk, State of Massachusetts, have invented an Improvement in Blindstitch Sewing-Machines, of which the following description, in connection with the accompanying drawing, is a specification, like characters on the drawing representing like parts.

This invention relates to improvements in machines for doing blind stitch work and particularly felling work, in which the edge raw or inturned of a superimposed layer or layers, is united to a main or base fabric. The machine herein illustrated as an embodiment of the present invention is of the Arbetter type of blind stitch machine in which the stitch forming mechanism is located above the bed plate and comprises an oscillating curved needle and a revolving hook or suitable looper mechanism coöperating therewith.

The present invention involves means for maintaining the plane of oscillation of the needle at a uniform angle to the bed plate and reciprocating the needle relatively therewith in such a manner that in forming one line of stitching it will pass beyond the edge of the superimposed layer and beneath the same in such a manner that the needle will be caused to penetrate the lower surface of the superimposed layer and emerge from the lower surface or that surface which will come adjacent the base layer when the seam is finished so as to cause the stitches to be wholly concealed.

The invention also involves mechanism partaking of the lateral movement of the needle, for guiding the needle during each of its oscillations, so that when the needle is to enter beneath the superimposed layer the needle guide will enter between the superimposed layer and the base fabric and insure the entry of the needle into the fabric at the desired point.

The invention also involves a novel construction of presser-foot adapted to coöperate with the laterally movable needle-guide to position properly the superimposed layer of fabric for the entrance and emergence of the needle therefrom.

The invention includes a novel bender mechanism for the main or base fabric whereby the distance said bender is thrust above the bed plate may be readily and accurately adjusted.

The invention also involves a novel feeding mechanism in which the feed dog is yieldingly mounted at each end and thereby adapted to yield readily in crossing seams or other obstructions.

Other objects and features of the invention will more fully appear from the accompanying description and drawings and will be pointed out in the subjoined claims. The drawings illustrate a preferred form of machine embodying my invention.

In the drawings:—

Figure 1:
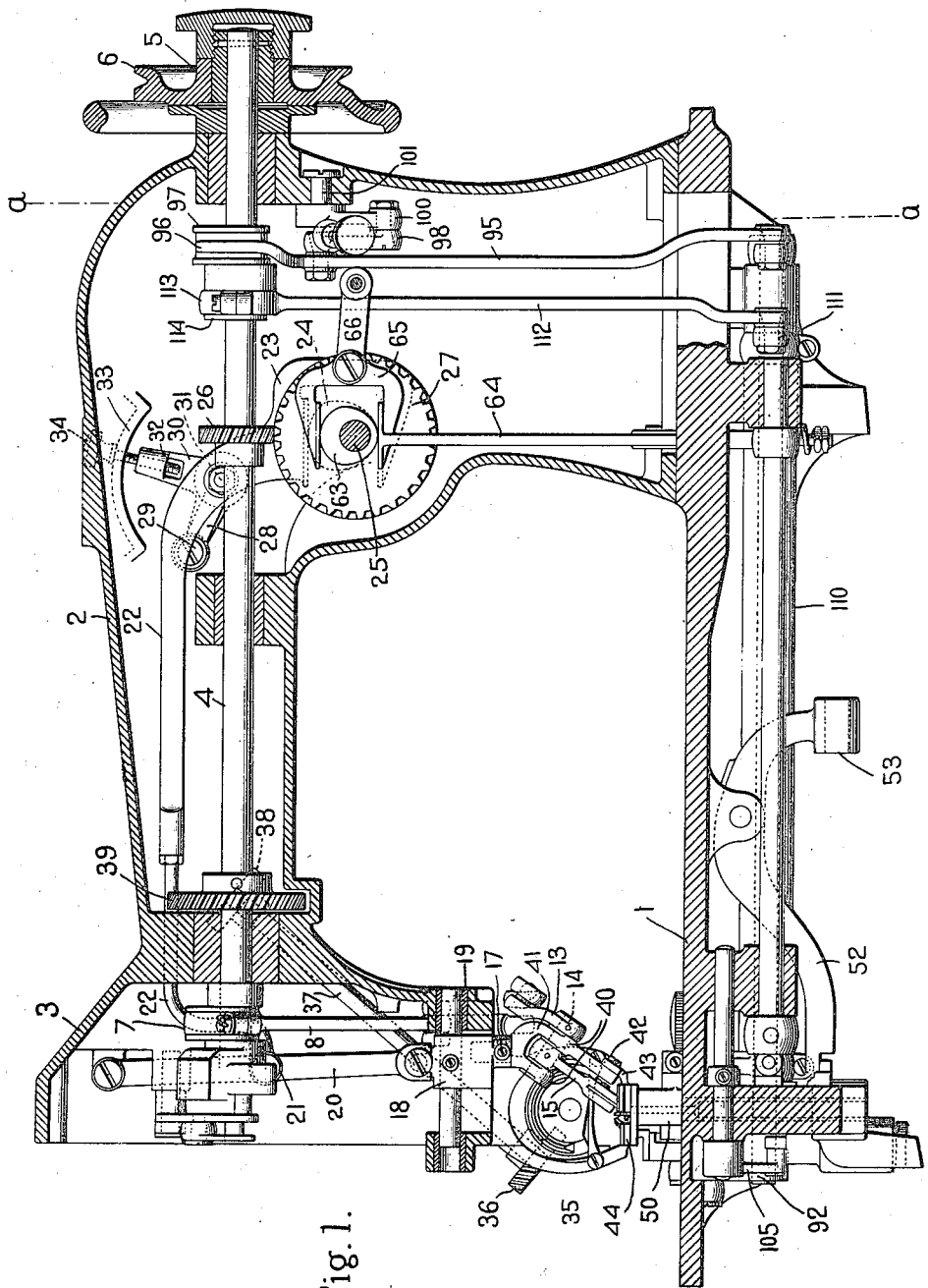
Figure 1 is a vertical sectional view longitudinally of the machine.
Figure 2:
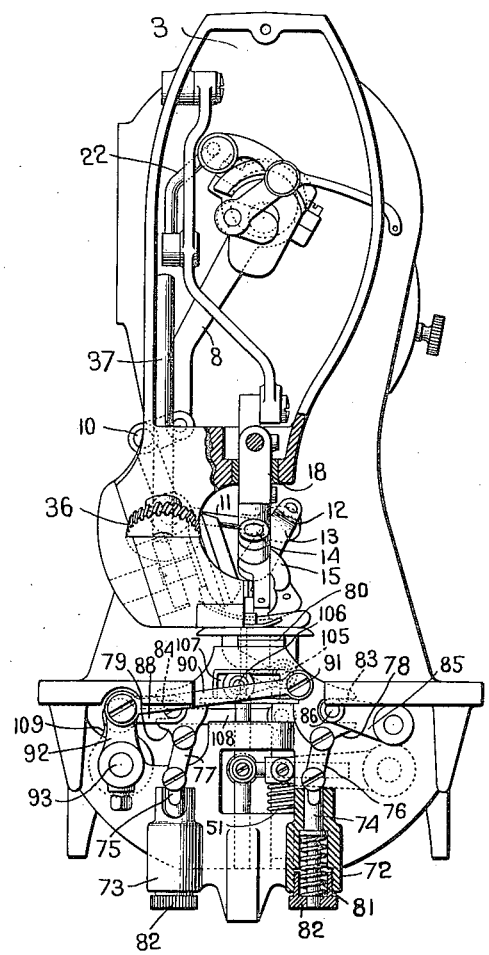
Fig. 2 is an end elevation with the face plate removed and parts broken away to show the needle operating and take up mechanisms.
Figure 3:
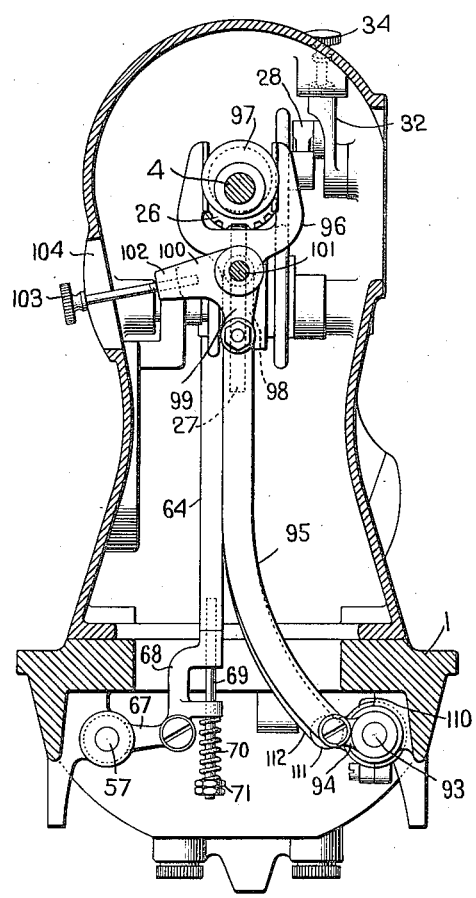
Fig. 3 is a transverse vertical section near the rear end of the machine on line $a$—$a$ Fig. 1.
Figure 4:
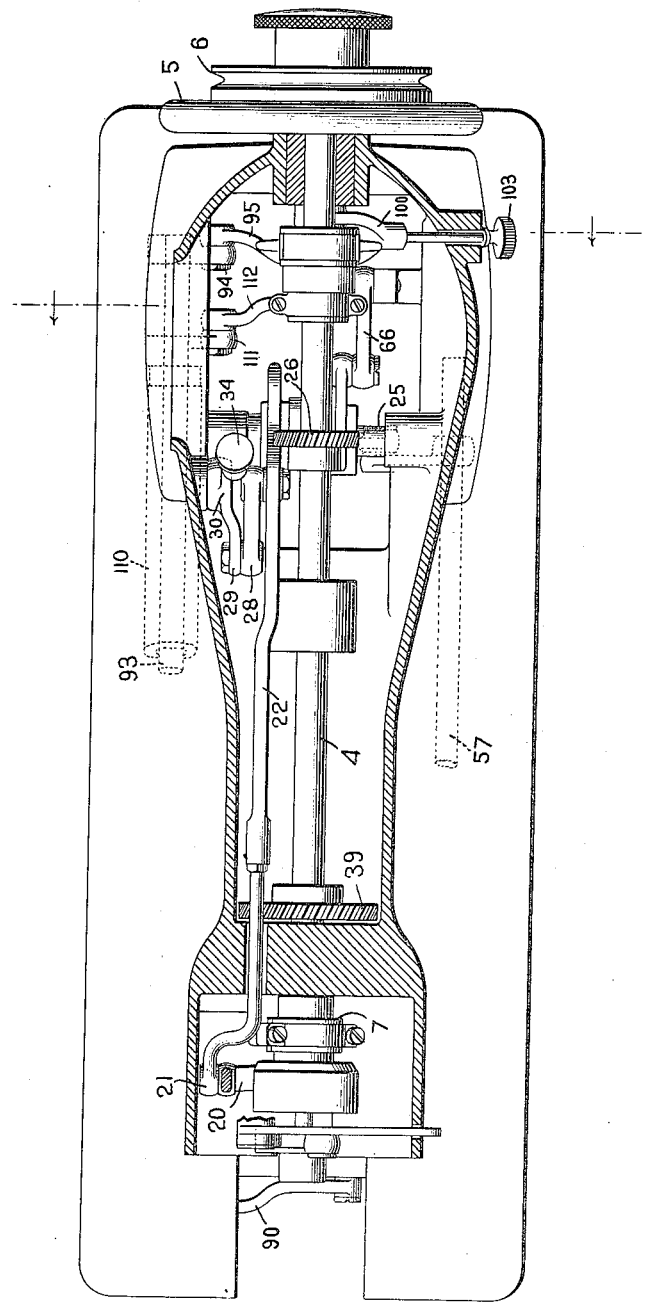
Fig. 4 is a horizontal sectional view of the arm of the machine and inclosed parts.
Figure 5:
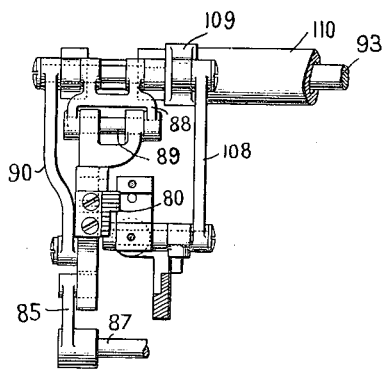
Fig. 5 is a detailed plan view of the feeding mechanism.
Figure 6:
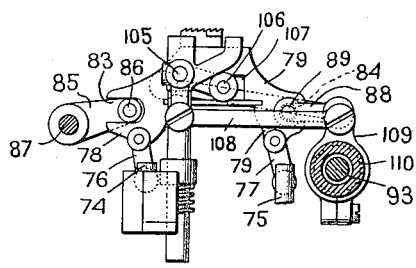
Fig. 6 is a detailed front elevation of the feeding mechanism.
Figure 7:
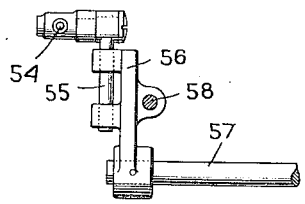
Fig. 7 is a detailed plan view of the bender.
Figure 8:
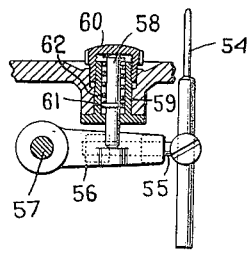
Fig. 8 is a detailed view partly in section of the bender and means for adjusting the same.
Figure 9:
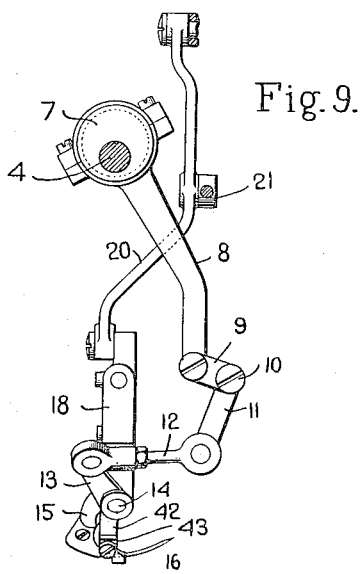
Fig. 9 is a detailed view of the needle operating mechanism.
Figure 10:
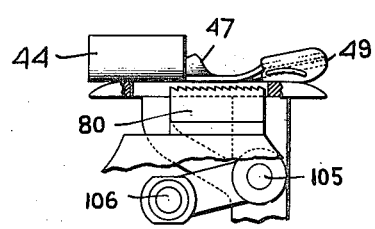
Fig. 10 is a sectional view of the presser-foot and feed dog coöperating therewith.
Figure 11:
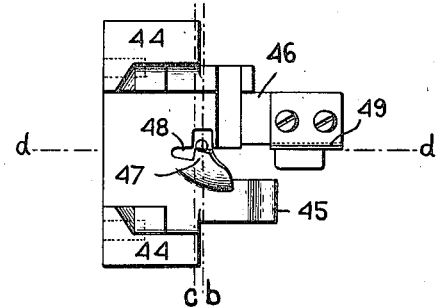
Fig. 11 is a plan view of the presser-foot.

In the drawings 1 represents the bed plate from which rises the usual overhanging arm 2, having at its forward end a head 3 provided with the usual removable face plate, (not shown).

The main driving shaft 4 extends horizontally through the overhanging arm and is provided with the usual hand wheel 5 and pulley 6 by which rotation is imparted to it. The forward end of the shaft 4 is provided with a cam 7 which is provided with a strap and link 8, which connects to an arm 9 of a rock shaft 10, which transmits movement through an arm 11 to a link 12, having universal joints at each end, to the arm 13 of the rock shaft 14 which carries the bar 15 for the curved needle 16. The rock shaft 14, about which the needle is oscillated is journaled in a bracket 41 depending from a carriage 18, which is slidably mounted in ways 19 in the lower portion of the head 3 the bracket 41 may be detachably secured to the carriage 18 by a set screw 17 passing through the boss on said carriage and engaging the stem of the bracket which projects into said boss and carriage. It will be seen that by the connections aforesaid, the rotary movement of the shaft 4 is transmitted through the several links and rock shafts and is transformed in such a manner as to give an oscillating movement to the needle.

The needle is shogged or given a bodily lateral movement transversely of the line of feed by causing the carriage 18, which supports the oscillating needle, to move backward and forward in its ways in the head of the machine. This motion is transmitted to the carriage 18 through a lever 20 which has a forked end embracing a stud upon said carriage and which is provided at about its middle with a stud 21 by which it is connected to the end to a floating link 22, which is provided at its rear end with a U-shaped part 23, which embraces a cam 24 upon a counter shaft 25, arranged beneath and at right angles to the main shaft, and driven therefrom through the spiral gears 26 and 27. The floating link 22 is connected intermediate of its ends to a link 28, which is connected to the end 29 of a bell crank lever 30, which is mounted upon a stud 31 within the hollow arm and has an arm 32 projecting through a slot 33 in said arm and adapted to be adjustably secured therein by a thumb screw 34. The pivot of the bell crank lever 30 is so arranged in respect to the axis of the floating link that the movement of the arm 32 in the slot will cause an upward or downward adjustment of the connection between the link 28 and the arm 29, and will thereby vary the extent of longitudinal movement of the floating link 22 and correspondingly regulate the amplitude of movement of the carriage 18, thus determining, the distance between the parallel rows of stitching made by the oscillating or reciprocating needle.

The revolving hook 35, or looper mechanism, which coöperates with the oscillating needle may be of the type ordinarily used in machines of this character, and as shown in the drawing, is driven through gears 36, shaft 37 and spiral gears 38 and 39, the latter being mounted upon the main shaft.

Any suitable take up mechanism may be used with my invention, and it is therefore unnecessary to describe the particular form of take up illustrated in the drawings. It may, however, be stated that the take up mechanism shown is substantially like that disclosed in Patent #695,915, granted March 25, 1902 to W. F. Deal and G. H. Dimond.

The rock shaft 14, which carries the oscillating needle, is supported at an angle to the plane of the bed plate in bearings 40 in the stud 41 which depends from the carriage 18. One of the bearings 40 has an extension 42 to which a needle-guide 43 is fixedly secured by a screw or other fastening device. It therefore follows that when the carriage 18 is reciprocated the needle and the needle-guide are correspondingly moved toward and from the line of feed, the needle-guide being always in position to receive the needle and support and direct it in its path through the material.

The material is guided past the stitch forming mechanism between the work support which is yieldingly mounted in the base plate and the presser-foot rigidly secured to the machine head. In the machine illustrated herein the presser-foot 44 is rigidly secured to the head of the machine by screws or otherwise, and is provided with forwardly extending toes 45, 46. Near the base of the outer toe 45 an upward and lateral projection 47 is provided, and the toe 46 is recessed at 48 opposite to said projection. An edge guide 49 is carried by the toe 46 in such a manner as to direct the edge of the superimposed layer beneath the projection 47 so that the needle may penetrate and emerge well within the edge of the fabric in the manner shown in Figs. 12, 13, 16 and 17. The toe 46 is also provided with a recess in which the needle guide reciprocates. It will be understood that when the needle is about to penetrate the superimposed layer of fabric the movable carriage for the needle will be at the limit of its movement toward the face or forward end of the overhanging arm and the needle-guide which is attached thereto, will at that time be thrust beneath the under surface of the superimposed layer and also beneath the projection 47, in the position shown in Figs. 13 and 16.

The stitch in the superimposed layer having been formed the next stitch is made in the base layer. In making such stitch the carriage 18, together with the needle and needle-guide, are moved laterally so that the needle and needle-guide are slightly beyond the edge of the superimposed layer. In this position the oscillating needle would normally pass above the upper surface of the base layer of the fabric, but is caused to penetrate the same by the action of a bender which is thrust through the bed plate directly beneath the path of the needle, and serves to bend the base layer of cloth upward sufficiently to permit the needle to pass through the upper surface thereof.

In this machine the bender is made adjustable, so that it may be caused to thrust a greater or less distance above the work support. The work support 50 is slidably mounted in guides in the bed plate 1 and is yieldingly supported therein by a spring 51. The usual means are provided for depressing the work support, which as shown in the drawing, is in the form of a bell crank lever 52 engaging a lug upon the work support and provided with a suitable knee lever 53. The bender 54 is mounted in suitable guides in the work support and is secured to a rod 55 which is slidably mounted in lugs extending laterally from the arm 56 of the rock shaft 57, which is actuated from a cam upon the countershaft 25. The upward thrust of the bender 54 is limited by a pin 58 which rests upon a shoulder projecting from the arm 56 of the rock shaft and extends up through a sleeve 59 which passes through the work plate and has a screw threaded cap 60, adapted to be engaged by the end of pin 58. The pin 58 is provided with a collar 61, and a spiral spring 62 surrounding said pin and interposed between the collar and the cap 60 serves to press the pin into constant engagement with the arm 56. The cap 60 extends above the work plate and is provided with milled edges whereby it may be easily rotated by the operator to adjust the thrust of the bender. In order to deaden the noise made by the reciprocation of this part the pin 58 is usually made of fibrous material.

The mechanism for operating said bender comprises a rock shaft 57, which is actuated from a cam 63 upon the countershaft 25 through the medium of a link 64 having a U-shaped end 65 embracing said cam, the end 65 being connected by a link 66 to a pivot carried by a stud on the inside of the overhanging arm. By reason of these connections the link 64 is given a substantially vertical reciprocating movement. The rock shaft 57 is provided near its rear end with an arm 67 to which is pivotally connected a member 68 having two laterally extending lugs or projections, through which a hole is bored to provide bearings. The link 64 is provided at its lower end with a cylindrical bolt or pin 69 which extends through the bearings in the member 68 and is provided at its end with a spiral spring 70, the adjustment of which may be secured by the lock-nuts 71. This forms a yielding connection between the countershaft 25 and the bender 54 so that if the bender is so adjusted that the rocker arm 56 may not have its full movement the other rocker arm 67 will cause the part 68 to slide along the rod 69 against the tension of the spring 70, thus giving the necessary resilience to the parts to compensate for any adjustment given to the bender.

In doing blind stitch it is frequently necessary to cross thick seams and in order to obviate any difficulty in doing so, the present invention comprises a feed dog independently yieldable at each end, means being provided for supporting the same in such a manner that the dog can readily yield upon meeting the seam and cross the same without difficulty, in the meanwhile giving the proper step by step advancement to the material being sewed.

In the machine illustrated herein the bed plate 1 is provided with a downwardly projecting portion in which the work support is yieldably mounted as aforesaid. This downwardly projecting portion is provided with bosses 72, 73, in which are slidably mounted pins 74, 75, the upper ends of which are provided with links 76, 77, which in turn are pivoted to downwardly projected lugs 78, 79 on the respective ends of the feed dog 80.

Each of the sliding pins 74 is yieldably and adjustably supported in its bearing by a spring 81 coöperating with an adjustable thumb nut 82 so that the yieldability of the respective ends of the feed dog may be adjusted independently as desired. The downwardly projecting lugs 78, 79, which coöperate with means for directing the feed dog in its movement are provided with lateral slots 83 and 84. A guiding link 85 is provided with a stud 86 which engages the slot 83 and is pivotally mounted on a stud 87 projecting from the depending frame. A similar link 88 provided with a short shaft 89 engages the slot 84, and is supported at its opposite end upon a rock shaft 93. By reason of the connections aforesaid the usual four motion movement may be imparted to the feed dog, notwithstanding the fact that its ends are independently yieldable and adjustable.

The forward and backward movement is given to the feed dog through a link 90, which is pivotally attached to said dog at 91 and is connected at its opposite end to an arm 92 upon the forward end of a solid rock shaft 93. The rock shaft 93 is journaled in lugs projecting downwardly from the plate and provided at its other end with an arm 94 which is pivotally attached to a floating link 95, which has a U-shaped end 96 embracing a cam 97 upon the main shaft 4. The floating link 95 is attached by a link 98 to one arm 99 of a bell crank lever 100 which is pivoted on a bolt or stud 101 projecting from the interior of the hollow frame. The other arm of the lever 102 is provided with a thumb screw 103, the stem of which extends through a slot 104 in the frame and is adjustable therein. The relation of the pivotal point 101 of the bell crank lever with the axis of the floating link 95 is such that the adjustment of the thumb screw 103 backward or forward in the slot 104 will cause a greater or less longitudinal movement in said floating link and thereby adjust the amplitude of vibration of the rock shaft and consequently the forward and the backward movement of the feed dog.

The upward and downward movement of the feed dog are produced through a rock shaft 105 journaled in the sliding stem of the work support 50. An arm extends from said rock shaft 105 and is provided with a pin 106 which engages a slot 107 in the feed dog. The other end of said rock shaft 105 is connected by a link 108 with an arm 109 extending from a sleeve 110 which surrounds the solid rock shaft 93, and is supported thereby. The opposite end of sleeve 110 is provided with an arm 111 which is connected to the link 112 having a strap 113, which embraces a cam 114 upon the main shaft. When in operation the cam 97 upon the main shaft transmits a longitudinal reciprocating motion to the floating link 95 which causes the solid rock shaft 93 to oscillate. This transmits backward and forward movement to the feed dog through the link 90 which is attached directly to the feed dog. Upward and downward movement of said dog is communicated through cam 114 on the main shaft and the link 112 to the sleeve 110, whereby said sleeve is caused to rock and it, in turn, acts through link 108 to oscillate the rock shaft 105, which has rigidly secured thereto the arm with the pin 106 which travels in slot 107 in the feed dog. Through the bell crank adjustment above described, the extent of the forward and backward reciprocating movement of the feed dog can be controlled.

The general construction and operation of the machine will be clear from the foregoing description.

While the machine as illustrated is arranged for felling work, and the invention is more particularly concerned with that type of work, still the invention in many of its features is of value in the production of padding or other kinds of blind stitch sewing.

The felling seam made by a machine embodying this invention is illustrated in its preferred forms in my pending application #779,943, filed July 19, 1913, although as therein set forth, the illustration of the seam is exaggerated and its relative proportions changed somewhat for the sake of clearness.

The manner in which the machine operates to make this seam will be clear particularly from the illustration in Figs. 10 to 16 of the drawing herein.

It is desirable in felling work that the thread shall not only be concealed on the right side of the fabric, which results from the use of blind stitches, but that it shall also be concealed, so far as practicable, on the side from which it is laid into the work. The machine of this invention effects this by placing the stitch in the superimposed layer entirely in the under surface, or that surface of the superimposed layer which will come under and adjacent the base layer when the threads are drawn up and the seam is finished. This result is secured by causing the needle to enter the under side of the superimposed layer well back from the edge and to emerge preferably from the under surface of the superimposed layer or at such a point in the superimposed layer that when the threads are tightened up by the tension this point will also come at the under surface. Then with the stitch in the base layer taken close to the edge, or even slightly under the edge, as is possible when the threads are drawn up, the entire mass of both threads will lie beneath the superimposed layer and be entirely concealed thereby.

Figure 15:
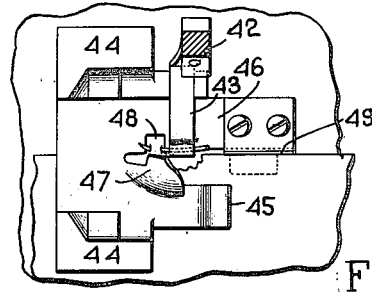
Fig. 15 is a plan view of the parts showing the needle-guide and the needle directed thereby entering the base layer of fabric.
Figure 16:
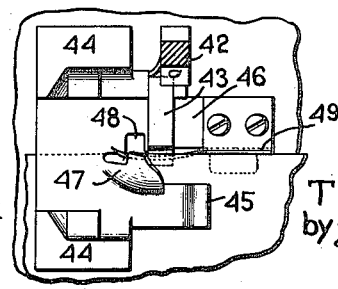
Fig. 16 is a plan view showing the needle-guide and the needle directed thereby entering the superimposed layer of fabric.
Figure 12:
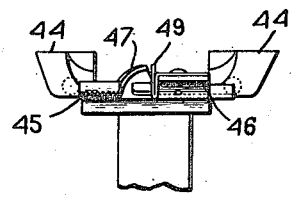
Fig. 12 is a front view of the presser-foot showing the guide for directing the edge of the superimposed fabric.
Figure 13:
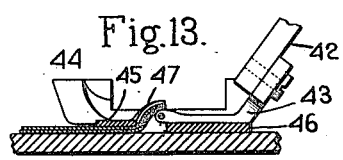
Fig. 13 is a vertical sectional view of the presser-foot showing the needle guide in position to direct the needle through the superimposed layer.
Figure 14:
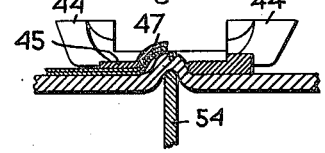
Fig. 14 is a vertical sectional view showing the bender in elevated position to cause the needle to penetrate the base layer of fabric, the section being taken on line $b$—$b$ Fig. 11.
Figure 17:
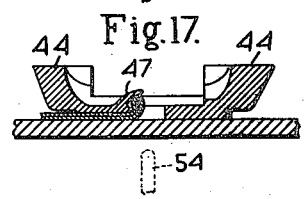
Fig. 17 is a sectional view on line c—c Fig. 11.
Figure 18:
Fig. 18 is a detailed sectional view of the presser-foot and guide on line d—d Fig. 11.
Figure 19:
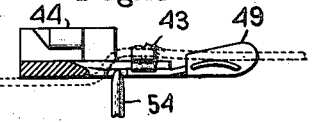
Fig. 19 is a vertical sectional view of the presser-foot showing relative positions of the edge of the guide, the needle-guide, and the bender.

In Figs. 13, 16 and 17 of the drawing, the needle is shown as making the stitch in the superimposed layer. It will be noted that the center of the swinging or oscillatory movement of the needle is back or much nearer the operator than the part of the fabric entered by the needle, and it will be also noted that the presser-foot and guiding devices formed thereon elevate the superimposed layer so as to present the under surface more nearly normal to the needle. The needle will thus as it swings forward, enter the under surface of the superimposed layer well back from the edge being accurately guided to secure this result by the needle guide of this invention, and the needle will come out either from the under surface or at the edge at a point which will come on the under surface when the threads are drawn up. The making of the stitch in the base layer is illustrated in Figs. 14 and 15. It will be seen that the point at which the stitch is taken in the base layer is very close to the line which the edge of the superimposed layer will occupy when the seam is finished, and with the inclined position of the needle required by this invention and the elevation of the superimposed edge secured by the guiding presser-foot this stitch may in fact be taken somewhat beneath the edge of the superimposed layer as it will lie in the finished seam. The stitch in the base layer is usually very short, but a few threads of the base layer being taken up. The feed may be readily so arranged that the needle in making successive stitches, the one in the superimposed layer and the other in the base layer they will emerge nearly opposite each other transversely of the seam, thus enabling the edge to be rolled into final position by a more direct pull on the bobbin thread connecting the loops of the needle thread.

Having fully described my invention what I claim as new and desire to secure by Letters Patent is:

1. In a machine for blind stitching having a work support, a curved oscillating needle, and complemental stitch forming mechanism located above said work support, and means for feeding the work across said support, means for supporting the needle comprising a sliding carriage having a downwardly projecting bracket, an inclined pivot on said bracket, a needle bar pivotally mounted thereon so that the plane of oscillation of the needle is obliquely and uniformly inclined to the work support, means for reciprocating said carriage and means for oscillating the needle to produce two rows of stitches.

2. In a machine for blind stitching for felling the edge of a superimposed layer or layers to a main layer of material comprising a curved oscillating needle and complemental stitch forming mechanism, a movable needle-guide and means for causing the same to enter beneath the edge of the superimposed fabric sufficiently to permit the needle to penetrate and emerge from the same at points beneath the displayed edge thereof, whereby the ends of the stitch, or the ends of the portion of the thread embedded in the superimposed layer or layers, are beneath the upper surface thereof.

3. In a machine for blind stitching, comprising a work support, a curved oscillating needle and complemental stitch forming mechanism located above said work support, means for feeding the work across said support, a sliding carriage upon which said oscillating needle is mounted, means for reciprocating said carriage, a needle-guide secured to said carriage and partaking the lateral movements of the needle.

4. In a machine for blind stitching for felling the edge of a superimposed layer or layers to a main layer of material, comprising a curved needle oscillating in a plane obliquely inclined to the work support, and complemental stitch forming mechanism located above said work support, means for moving the needle laterally relative to said work support, and a needle guide partaking the lateral movement of the needle adapted to pass beneath the edge of the superimposed layer or layers, whereby the points of entrance and emergence of the needle and consequently the ends of the stitch are beneath the upper surface thereof.

5. In a machine for blind stitching for felling comprising a work support, a curved oscillating needle and complemental stitch mechanism located and operating above said work support, means for feeding material across said work support, a presser foot having a bifurcated end forming toes, a projection extending upwardly and laterally from the inner side of the outer toe, a relatively movable needle-guide adapted to coöperate with said projection to support the edge of the superimposed layer so that the needle is caused to enter and emerge from the under surface of the superimposed layer.

6. In a sewing machine comprising a bed plate, a work support, a curved oscillating needle and complemental stitch forming mechanism located and operating above the work support, and means for feeding material across said work support, a bender for said material adapted to be projected through said work support, mechanism for operating said bender, a yieldable connection between said mechanism and said bender and adjustable means on the bed plate for limiting the distance said bender is thrust beyond the surface of the work support.

7. In a sewing machine comprising a bed plate, a work support, a curved oscillating needle and complemental stitch forming mechanism located and operating above the work support, and means for feeding material across said work support, a bender for said material adapted to be projected through said work support, mechanism for operating said bender, a yieldable connection between said mechanism and said bender, and hand operated means extending through and adjustably from above said bed plate for adjusting the limit of the thrust of said bender beyond the surface of the work support.

8. In a sewing machine having a work support, a curved oscillating needle and complemental stitch forming mechanism located and operating above the work support, and means for feeding material across said work support, a bender for said material slidably mounted in and adapted to be projected through said work support, and means for operating said bender comprising a suitably timed cam, a member operated thereby, a spring supported sleeve slidably mounted on said member, a rock shaft pivotally connected to said sleeve and having an arm extending beneath said bender, and adjustable means for limiting the upward thrusts of the bender beyond the surface of said work support.

9. In a sewing machine having a bed plate, a work support, a curved oscillating needle and complemental stitch forming mechanism located and operating above the work support, and means for feeding material across said work support, a bender for said material adapted to be projected through said work support, and means for operating said bender comprising a suitably timed cam, a member operated thereby, a spring supported sleeve slidably mounted on said member, a rock shaft provided with arms respectively connected to said sleeve and to said bender, and a pin engaging the arm of the rock shaft which is connected to the bender, to limit the upward movement of said arm, and consequently the amount of projection of said bender above the surface of the work support, and adjustable means located above said bed plate, against which said pin impinges.

10. In a machine for blind stitching comprising a work support, a curved oscillating needle, and complemental stitch forming mechanism located and operating above said work support, and means for feeding the work over said support, means for moving the needle laterally relative to said work support to produce two lines of stitching comprising a sliding carriage, a lever connected at one end to said carriage, a floating member connected to said lever intermediate of its ends, a cam engaging said floating member and means for controlling the amount of endwise movement imparted by said cam to said floating member.

11. In a machine for blind stitching comprising a hollow arm, a work support, a curved oscillating needle, and complemental stitch forming mechanism located and operating above said work support, and means for feeding the work over said support, means for moving the needle laterally relative to said work support to produce two lines of stitching comprising a sliding carriage, a lever pivotally connected at one end to said carriage, a member connected to said lever intermediate its ends, a cam engaging said member and means including an adjustable bell crank lever pivoted within said hollow arm and link connections between the same and said member for controlling the amount of endwise movement imparted by said cam to said member.

12. In a machine for blind stitching comprising a work support, a curved oscillating needle, means for supporting the same above the work support and complemental stitch forming mechanism located and operating above the work support, means for moving the needle laterally relative to the work support to produce two lines of stitching comprising a floating member connected to said needle supporting means, a cam engaging said floating member and means for controlling the endwise movement imparted by said cam to said floating member.

13. In a machine for blind stitching comprising a work support, a curved oscillating needle, means for supporting the same above the work support and complemental stitch forming mechanism located and operating above the work support, means for moving the needle laterally relative to the work support to produce two lines of stitching comprising a floating member connected to said needle supporting means, a cam engaging said floating member and means for controlling the endwise movement imparted by said cam to said floating member, including an adjustable bell crank lever connected by a link to said floating member intermediate of said cam and said needle supporting means.

In testimony whereof, I have signed my name to this specification, in the presence of two subscribing witnesses.

THOMAS J. HAYES.

Witnesses:
FREDERICK A. TENNANT,
THOMAS J. DRUMMOND.